United States Patent
Cornwall et al.

(10) Patent No.: US 11,259,247 B2
(45) Date of Patent: *Feb. 22, 2022

(54) DEVICE AND BATTERY MANAGEMENT IN A CELLULAR NETWORK

(71) Applicant: Itron, Inc., Liberty Lake, WA (US)

(72) Inventors: Mark K. Cornwall, Spokane, WA (US); Scott L. Cumeralto, Spokane Valley, WA (US)

(73) Assignee: Itron, Inc., Liberty Lake, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/531,996

(22) Filed: Aug. 5, 2019

(65) Prior Publication Data

US 2019/0364508 A1 Nov. 28, 2019

Related U.S. Application Data

(63) Continuation of application No. 15/480,965, filed on Apr. 6, 2017, now Pat. No. 10,375,642.

(51) Int. Cl.
*H04W 24/10* (2009.01)
*H04W 52/02* (2009.01)
(Continued)

(52) U.S. Cl.
CPC .......... *H04W 52/0258* (2013.01); *H04Q 9/00* (2013.01); *H04W 24/10* (2013.01);
(Continued)

(58) Field of Classification Search
CPC ....................................................... H04L 12/28
(Continued)

(56) References Cited

U.S. PATENT DOCUMENTS 6,678,538 B1 1/2004 Koizumi
9,929,772 B2 3/2018 Rose et al.
(Continued)

FOREIGN PATENT DOCUMENTS

EP 2996406 A1 3/2016
EP 2973933 B1 10/2017
(Continued)

OTHER PUBLICATIONS

PCT Search Report and Written Opinion dated Apr. 2, 2020 for PCT Application No. PCT/US2019/054861, 14 pages.
(Continued)

*Primary Examiner* — Dang T Ton
(74) *Attorney, Agent, or Firm* — Lee & Hayes, P.C.

(57) ABSTRACT

Techniques for managing battery powered devices in a cellular network are described herein. In some instances, a receiving device, such as a data collector, may receive transmissions from a network endpoint, such as a utility meter. The messages may contain an indication of a power level used in the transmission. The receiving device may estimate a battery end-of-life date of the network endpoint, based at least in part on a known reporting schedule of the endpoint and the power level used in transmissions. The receiving device or the endpoint may revise the reporting schedule to modify the battery end-of-life date. In addition to modification of the reporting schedule, the endpoint power of transmission can be modified, based on RSSI and/or a transmission retry count.

20 Claims, 8 Drawing Sheets

(51) Int. Cl.
*H04Q 9/00* (2006.01)
*H04W 84/18* (2009.01)

(52) U.S. Cl.
CPC ... *H04W 52/0216* (2013.01); *H04W 52/0219* (2013.01); *H04W 52/0261* (2013.01); *H04Q 2209/25* (2013.01); *H04Q 2209/40* (2013.01); *H04Q 2209/60* (2013.01); *H04Q 2209/88* (2013.01); *H04W 84/18* (2013.01); *Y02D 30/70* (2020.08)

(58) Field of Classification Search
USPC .......................................................... 370/401
See application file for complete search history.

(56) References Cited

U.S. PATENT DOCUMENTS

| | | | |
|---|---|---|---|
| 10,085,275 B2 | 9/2018 | Elsayed et al. | |
| 2009/0149127 A1 | 6/2009 | Viitamaki et al. | |
| 2010/0026517 A1* | 2/2010 | Cumeralto | G01D 4/006 340/870.03 |
| 2013/0182625 A1 | 7/2013 | Kuehnel et al. | |
| 2013/0331081 A1 | 12/2013 | Rune et al. | |
| 2014/0024416 A1 | 1/2014 | Xie et al. | |
| 2016/0260059 A1 | 9/2016 | Benjamin et al. | |
| 2017/0061920 A1 | 3/2017 | Dey et al. | |
| 2017/0093540 A1 | 3/2017 | Lei et al. | |
| 2017/0135052 A1 | 5/2017 | Lei et al. | |
| 2018/0084505 A1 | 3/2018 | Guillen | |
| 2018/0124544 A1 | 5/2018 | Gupta et al. | |
| 2018/0139697 A1 | 5/2018 | Kim et al. | |
| 2018/0152889 A1 | 5/2018 | Kim et al. | |
| 2018/0295583 A1 | 10/2018 | Cornwall et al. | |
| 2018/0321356 A1* | 11/2018 | Kulkarni | G01S 5/04 |
| 2019/0342722 A1 | 11/2019 | Lee et al. | |
| 2020/0100088 A1 | 3/2020 | Kim et al. | |
| 2020/0107237 A1 | 4/2020 | Mangalvedhe et al. | |
| 2020/0112915 A1 | 4/2020 | Dusenberry et al. | |
| 2020/0112916 A1 | 4/2020 | Dusenberry | |
| 2020/0120478 A1 | 4/2020 | Kim | |
| 2020/0267670 A1 | 8/2020 | Strom et al. | |
| 2020/0359315 A1 | 11/2020 | Dusenberry et al. | |
| 2021/0195520 A1 | 6/2021 | Dusenberry | |

FOREIGN PATENT DOCUMENTS

| | | |
|---|---|---|
| GB | 2549793 A | 11/2017 |
| WO | WO2008086231 | 7/2008 |
| WO | WO2012142657 | 10/2012 |
| WO | WO2016122394 | 8/2016 |
| WO | WO2016140969 | 9/2016 |
| WO | WO2018086062 | 5/2018 |

OTHER PUBLICATIONS

Non-Final Office Action dated Nov. 20, 2018 for U.S. Appl. No. 15/480,965 "Device and Battery Management in a Cellular Network" Cornwall, 10 pages.

Office action for U.S. Appl. No. 15/480,965, dated Jul. 18, 2018, Cornwall, "Device and Battery Management in a Cellular Network", 9 pages.

PCT Search Report and Written Opinion dated Jun. 5, 2018 for PCT application No. PCT/US2018/020550, 13 pages.

Power Saving Mode (PSM) in UEs, MME Administration Guide, StarOS Release 21, unknown release date, retrieved Oct. 1, 2018, 6 pages.

Invitation to Pay Additional Fees dated Dec. 10, 2019 for PCT Application No. PCT/US2019/054861, "Battery Power Management for a Cellular Device", 11 pages.

PCT Search Report and Written Opinion dated Jan. 7, 2020, for PCT Application No. PCT/US2019/054865, 14 pages.

Office Action for U.S. Appl. No. 16/237,233, dated Jul. 14, 2020, Dusenberry, "Battery Power Management for a Cellular Device", 11 pages.

* cited by examiner

DEVICE AND BATTERY MANAGEMENT IN A CELLULAR NETWORK

RELATED APPLICATIONS

This application is a continuation of and claims priority to U.S. patent application Ser. No. 15/480,965, filed on Mar. 6, 2017, entitled "Device and Battery Management in a Cellular Network" which is incorporated herein by reference in its entirety.

BACKGROUND

In the utility industry, gas meters and water meters are traditionally battery powered. In most cases, ten- or twenty-year battery life is a design parameter. Unfortunately, after a meter is installed there is little that can be done to improve the battery life. In most cases, the operations performed by the battery-powered meter, such as radio transmissions that report consumer usages, are counted. Using the count, an end-of-life for the battery can be estimated. At some point, e.g., when the battery has a calculated 10% of life remaining, the battery will be flagged for replacement.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Moreover, the figures are intended to illustrate general concepts, and not to indicate required and/or necessary elements.

DETAILED DESCRIPTION

Overview

Figure 1:
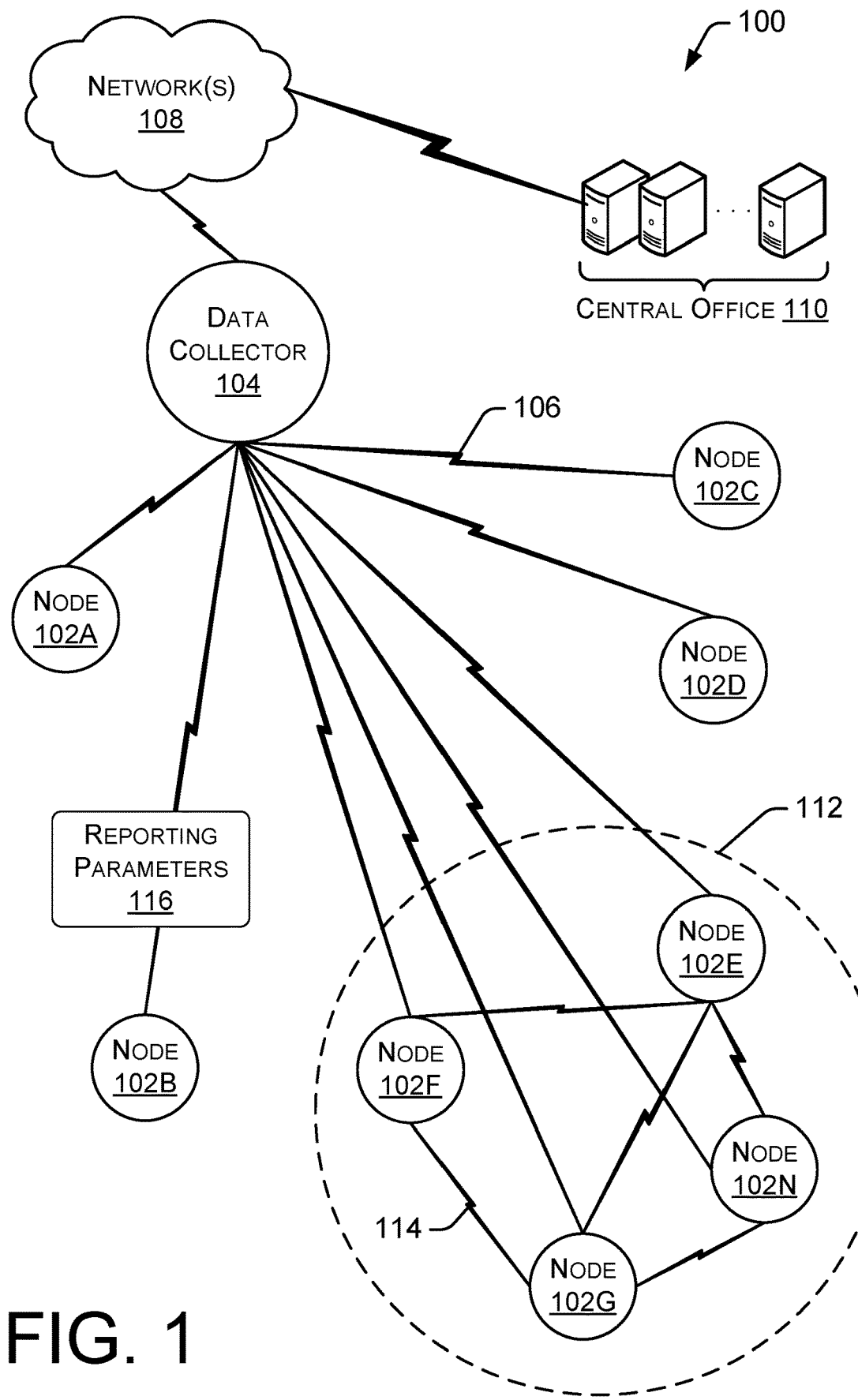
FIG. 1 is a diagram showing an example network including a plurality of endpoints in cellular communication with a data collector, and including a mesh network allowing several endpoints to communicate with each other and with the data collector via a cellular connection of at least one of the endpoints of the mesh network.

Innovations discussed here include the adaptation of cellular networks for use in data reporting by utility meters, and for other uses in the retail, warehousing, transportation and internet-of-things (IoT) related industries. Previously, the power required for long-term operation of battery-powered devices on a cellular network has been too high for long-term use. However, innovations discussed herein allow use of cellular network connections, such as cellular network category M (NB1 in Europe), in many battery-powered applications. In some examples, the innovations utilize information, including the transmit power level used at signal transmission, a schedule of transmissions, an actual or allowable number of transmission retries, and/or a received signal strength indicator (RSSI) obtained at signal reception. Use of this information allows for calculation of a battery end-of-life date and allows for modification of reporting parameters, such as a power of transmission used by the endpoint and a reporting schedule(s) used by the endpoint, to affect the battery end-of-life date.

The disclosure describes techniques for changing behavior of a network node (e.g., a network endpoint) to result in longer battery life and/or more convenient battery replacement. An example illustrating some of the techniques discussed herein—not to be considered a full or comprehensive discussion—may assist the reader. In the example, a radio associated with a computing device may receive a first message from an endpoint over a cellular connection. The first message may have been sent according to a first reporting parameters, which may govern the reporting of consumable product (e.g., natural gas or water). The reporting parameters may include a reporting schedule, a transmission power level, etc. In other examples, the message may be related to the management of products generally, particularly battery powered radio devices networked to control location, inventory, activity and other internet-of-things (IoT) activities. The first message may include an indication of a power level used by the endpoint in transmitting the message over the cellular link. Based at least in part on the first reporting schedule and the indication of the power level, a battery end-of-life date of the endpoint may be estimated. Based on one or more of the first reporting schedule, the power used in transmission, a number of retries associated with transmissions, a received signal strength indicator associated with the first message, and battery characteristics, replacement reporting parameters and/or a second reporting schedule for use by the endpoint may be derived. The second reporting parameters and/or reporting schedule may result in extension of the estimated battery end-of-life date of the endpoint. Alternatively, the second reporting scheduled may position the end-of-life date to be more similar to other batteries of other endpoints geographically near the endpoint. In the latter circumstance, the batteries of several endpoints may be replaced more conveniently by work crews.

Example System and Techniques

FIG. 1 is a diagram showing an example network 100 including a plurality of network endpoints, utility meters and/or network nodes 102A-102N in cellular communication with a data collector 104. The endpoints 102 may be associated with metering devices in the utility industry (e.g., metering water or natural gas). Alternatively, the endpoints 102 may be objects of any type, typically relying on battery power, and associated with an IoT infrastructure. In one example, the communication between endpoints and the data collector 104 may be made by means of radio frequency (RF) signals 106 compliant with cellular network category M (NB1 in Europe). The data collector 104 may include and/or utilize a cellular tower configured to communicate with a plurality of endpoints, and optionally other devices. The data collector 104 may also be in communication over networks 108 (e.g., the internet) with a central office 110. The central office 110 may be a utility company office, which may be monitoring one or more networks supplying water, gas and/or other consumables to a plurality of customer locations. The central office 110 may represent, alternatively or additionally, a third party configured to monitor the network(s) of endpoints on behalf of, or in conjunction with, the utility company. Such a third party may provide one or more servers to communicate with endpoint devices to control reporting schedules, power settings, allowable transmission retry numbers, and/or other factors. Control over the endpoints may result in better battery management and longer battery life. Additionally, more reliable communication may result, with less lost data.

In an example of optionally employed techniques, a local mesh network 112 may be configured. The local mesh network 112 may be configured at the direction of the central office 110. Alternatively, the local mesh network 112 may be configured based on initiative of one or more of the endpoints themselves. In an example, endpoints may contact other endpoints at prescribed times, periodic times, or other times, as indicated by design parameters. A group of endpoints may be defined as desired, such as to include all endpoints within a threshold distance of all other endpoints. Each endpoint may be a member of zero, one or more local mesh groups, depending on geography, available battery power, or other factors. The devices included within the local mesh network 112 may communicate with other members of the local mesh network 112 by non-cellular techniques and signals 114, typically involving power requirements that are lower than those required by cellular technologies. The local mesh network may allow endpoints having sufficient battery power to serve as a relay device, to relay communications to, and/or from, other endpoints (e.g., endpoints having less available battery power). In downstream communications, the mesh network 112 may serve to distribute information received by the relay endpoint to other endpoints using the low power transmitters. Thus, endpoints with stronger batteries and/or more efficient or reliable cellular connections to the data collector 104 may receive data from other endpoints within the local mesh network 112, and relay that data to the data collector 104.

In an example, the data collector 104 may send reporting parameters 116 to one or more endpoints or nodes 102. The reporting parameters may include a reporting schedule and/or a power of transmission to be used when transmitting reports according to the reporting schedule. The reporting parameters 116 may be revised periodically or on occasion by the data collector 104, central office 110 and/or a third party somewhere on the internet 108. In a further example, the reporting parameters may be configured by the endpoint or node 102, and may include input (e.g., RSSI values) from the data collector 104.

Figure 2:
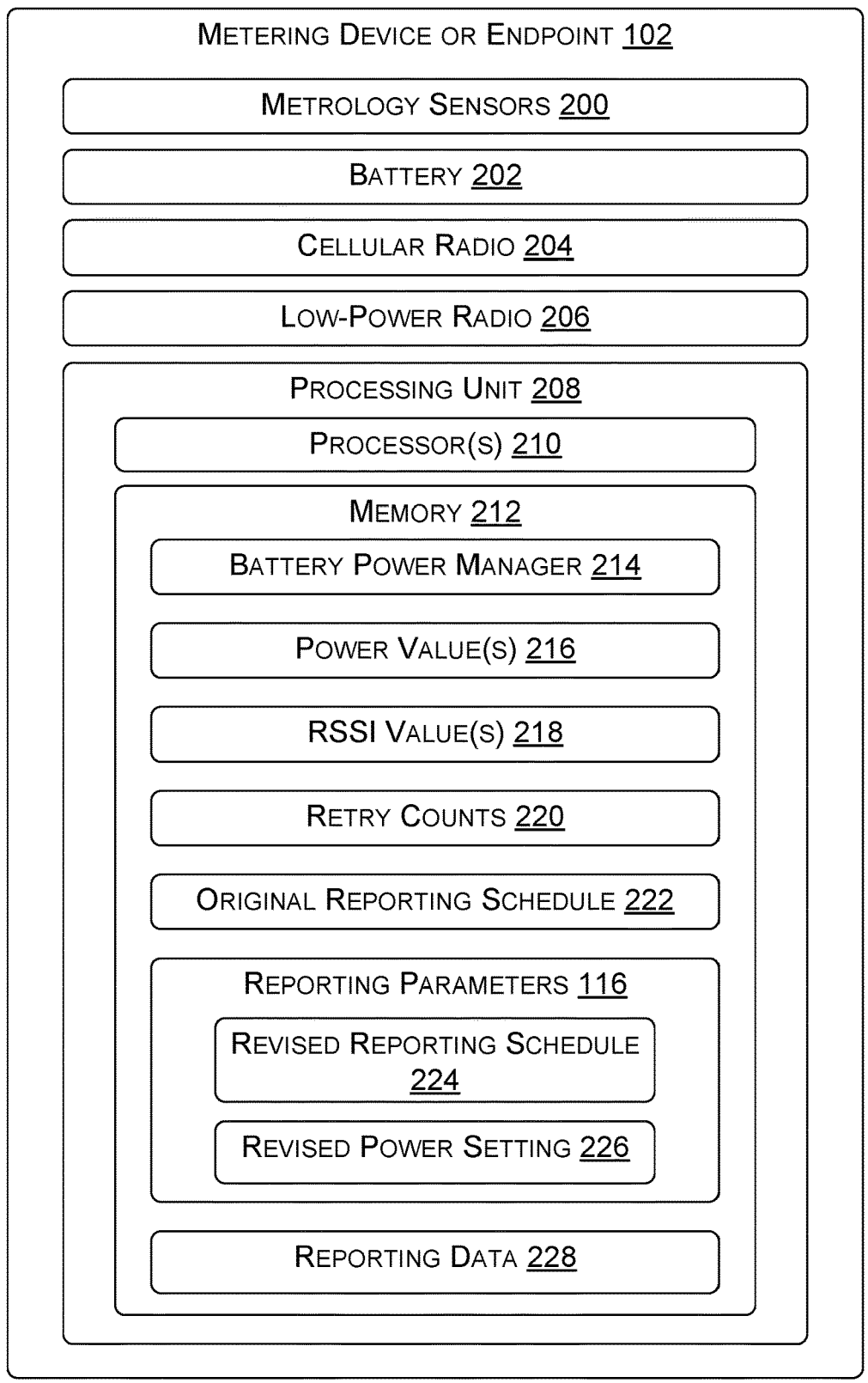
FIG. 2 is a block diagram showing an example structure of an endpoint.

FIG. 2 is a block diagram showing example structure of an endpoint 102. In the example shown, the endpoint 102 is configured as a battery-powered metering device, having metrology sensors 200 and a battery 202. However, in an alternative, the endpoint 102 could be configured to provide functionality required by any battery-powered IoT device. In the example shown, a cellular radio 204 is configured for RF transmission compliant with cellular network category M (NB1 in Europe). However, the techniques describe herein are adapted to other technologies and future variants of existing technologies. A low-power radio 206 is representative of RF devices having power requirements that are less than the cellular radio 204. Accordingly, the low-power radio 206 may be used to form one or more local mesh networks, as indicated by a particular network design.

A processing unit 208 may include one or more processors 210 and one or more memory devices 212. The battery power manager 214 is representative of programming or other logic defined in hardware or software that is configured to regulate the use of battery-powered activities and therefore a rate of battery depletion. In an example, the battery power manager 214 may receive as input data regarding endpoint performance, and may provide as output instructions to direct operation of an endpoint. In such an example, the battery power manager 214 may utilize one or more stored values, files and/or databases such as cellular radio transmission power levels and/or values 216, RSSI values 218 and/or allowed and/or actual transmission retry numbers 220. The power values 216 describe the power settings used by the endpoint 102 in prior cellular transmissions. The RSSI values describe the RSSI values determined or measured by a receiver of a transmission from the endpoint, such as the data collector 104. In an example, the data collector 104 can determine the RSSI value associated with a transmission by the endpoint 102, and return this value to the endpoint in a responding transmission. The transmission retry counts 220 may indicate a number of "retries," or repeated transmissions sent by, and/or allowed to be sent by, the endpoint to the data collector associated with each transmission.

In operation, the battery power manager 214 may use one or more of the power values 216, the RSSI values 218, the retry counts 220 and/or the original or existing reporting schedule 222 to derive, calculate and/or estimate an estimated end-of-life date for the battery 202. Based on the estimated end-of-life date for the battery, the battery power manager 214 may calculate one or more revised reporting parameters 116, such as a revised reporting schedule 224 and/or a revised power setting 226. Using the revised reporting schedule 224 and/or the revised power setting 226, the endpoint 102 is able to advantageously adjust the predicted end-of-life date of the battery 202. In some cases, adjustment of the reporting schedule will lengthen the battery life by reducing a reporting frequency from a preferred frequency to a required minimal reporting frequency. In other cases, due to favorable RSSI data, the battery power manager 214 may determine that adjustment of the power level will not result in undue retries, and will save power. In still other cases, some combination of adjustment of the reporting schedule and power of transmission will result in favorable extension of the battery end-of-life date. Alternatively, if it appears that other batteries in other endpoints that are geographically near to the endpoint 102 have an end-of-life date that cannot be extended, it may be advantageous to increase the reporting schedule from minimal to a preferred reporting schedule. Such a revision may hasten the end-of-life date of the battery 202, but the battery may be conveniently replaced while work crews are replacing other nearby batteries.

The endpoint 102 is therefore able to report consumption data 228 or other information according to reporting parameters 116, that may include a revised reporting schedule 224 and/or a revised power setting 226. The revised reporting schedule 224 and the revised power setting 226 will result in a revised estimated end-of-life date of the battery 202 that is advantageously later than would otherwise be the case, or earlier than would otherwise be the case, but during a time when the battery is more conveniently replaced.

Figure 3:
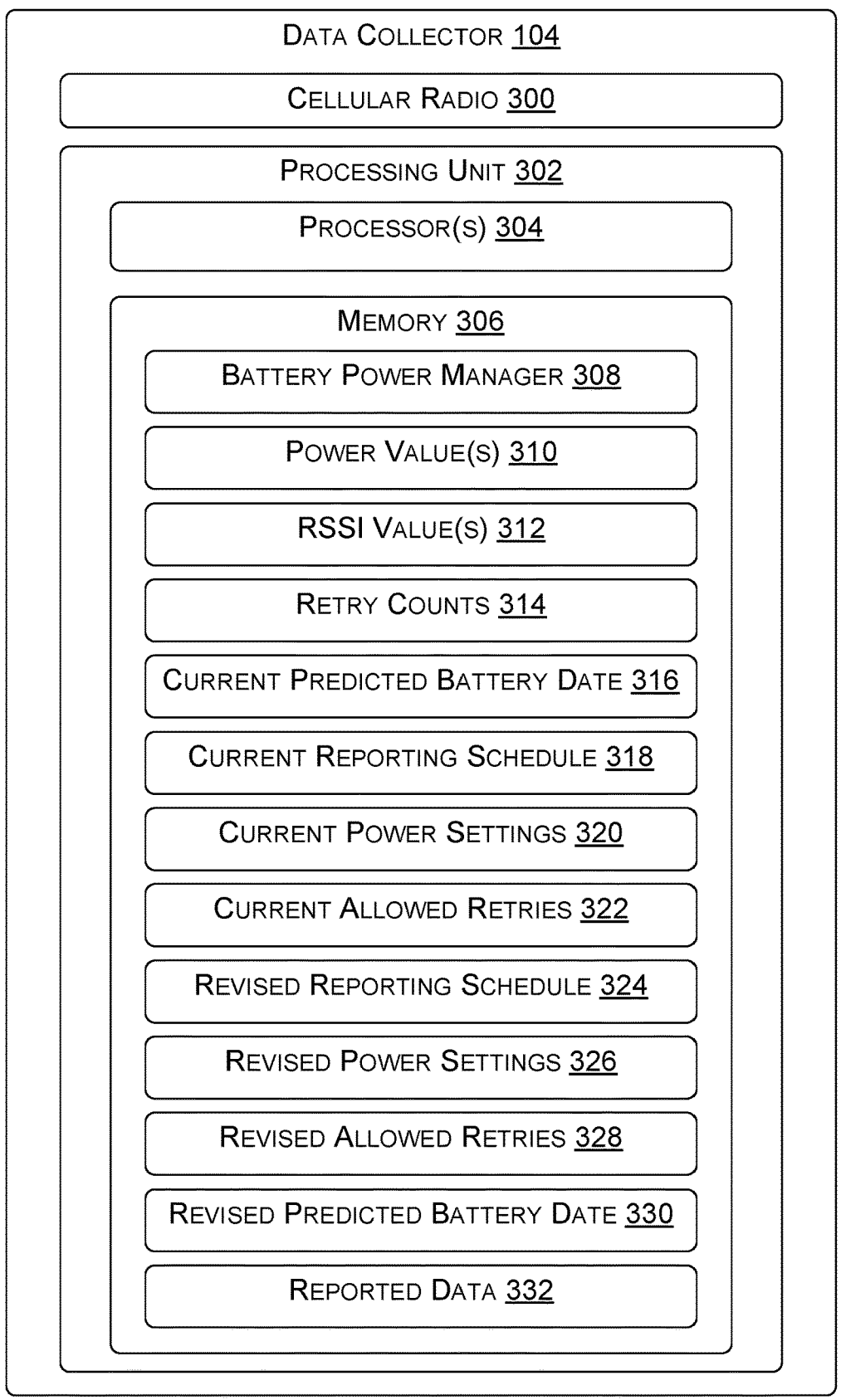
FIG. 3 is a block diagram showing an example structure of a data collector.

FIG. 3 is a block diagram showing example structure of a network data collector 104. In the example, a cellular radio 300 communicates with each of a plurality of endpoints (e.g., metering devices, such as gas and water meters). Alternatively, FIG. 3 describes aspects of the structure of a server 110, or third party server in the cloud 108, although the cellular radio 300 may be located on the data collector 110. A processing unit 302 may include one or more processors 304 and one or more memory devices 306. A battery power manager 308 is similar in structure and function to the battery power manager 214 of the endpoint 102 of FIG. 2, except that the manager 308 may be configured to manage the reporting schedules and power levels used by a plurality of endpoints. The battery power manager 308 may use one or more input values, such as reporting schedule used by an endpoint, the transmission power values 310 of endpoint transmissions, the RSSI values 312 of signals received from endpoint, and the retry counts 314 of transmissions made by endpoint. The battery power manager 308 may determine if an original predicted battery end-of-life date 316 is acceptable. The original or current predicted battery end-of-life date 316 may be too soon, and adjustments must be made to result in longer battery life. Alternatively, it may be preferable to instruct the endpoint to send data more frequently, even if the battery dies sooner, because the added data has value and the battery can be conveniently replaced at the same time as batteries of other nearby endpoints. If the battery end-of-life date 316 is unacceptable, the battery power manager 308 may revise an original/current reporting schedule 318 for the endpoint, revise original/current power levels 320 and/or revise original/current allowed retries 322 used in transmissions by the endpoint. The revised reporting schedule 324, revised power settings 326 and revised allowed number of retries 328 should be selected to result in a revised predicted battery end-of-life date 330. In an example, if the battery type in the endpoint is known, and the number of past transmissions including retries is known, and the number of future transmissions can be calculated based on the schedule and assumed levels of retries, the battery end-of-life date 330 may be calculated. The reporting schedule 324, the revised power settings 326 and/or the revised allowed number of retries 328 may be sent to the endpoint. The endpoint will then begin to operate using the revised settings (e.g., reporting parameters). Accordingly, the endpoint(s) will send data, which may be stored as reported data 332, for processing at the central office 110 or other appropriate location.

Example Methods

In some examples of the techniques discusses herein, the methods of operation may be performed by one or more application specific integrated circuits (ASIC) or may be performed by a general purpose processor utilizing software defined in computer readable media. In the examples and techniques discussed herein, the memory 212 or 306 may comprise computer-readable media and may take the form of volatile memory, such as random access memory (RAM) and/or non-volatile memory, such as read only memory (ROM) or flash RAM. Computer-readable media devices include volatile and non-volatile, removable and non-removable media implemented in any method or technology for storage of information such as computer-readable instructions, data structures, program modules, or other data for execution by one or more processors of a computing device. Examples of computer-readable media include, but are not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transitory medium that can be used to store information for access by a computing device.

As defined herein, computer-readable media does not include transitory media, such as modulated data signals and carrier waves, and/or signals.

FIGS. 4-9 are flow diagrams showing an example processes that are representative of techniques for use in device management and battery management. The processes may, but need not necessarily, be implemented in whole or in part by the systems of FIGS. 1-3.

Figure 4:
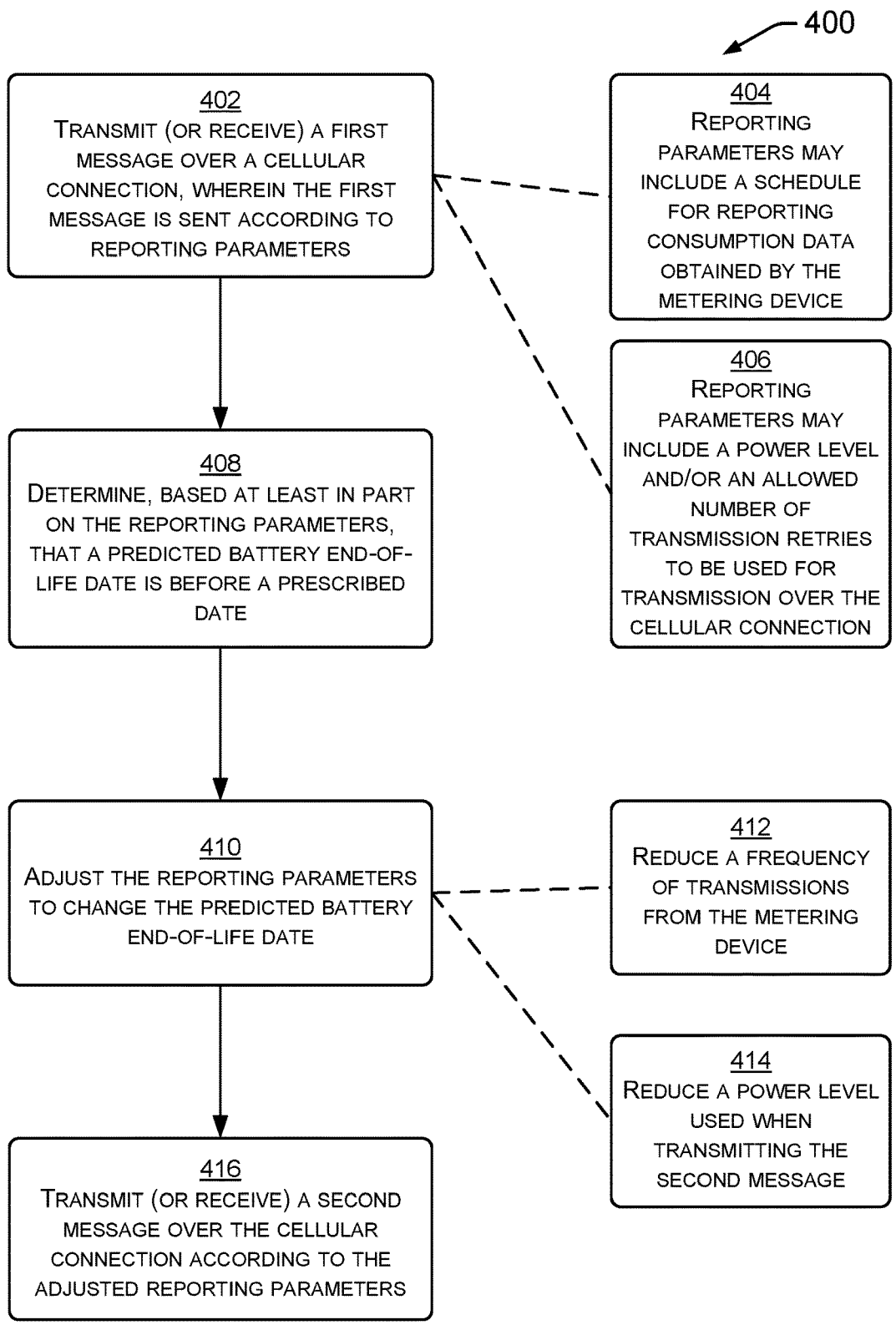
FIG. 4 is a block diagram showing example techniques by which a network endpoint can alter reporting parameters to save battery power.

FIG. 4 is a block diagram showing a first example of techniques 400 to adjust a reporting schedule, an endpoint transmission power level and/or an allowable number of endpoint transmission retries. The techniques may be adapted for performance by either a network endpoint or a network server. Such adjustments may be configured to save battery power and/or to extend or control a battery end-of-life date. The reporting schedule may control the times at which an endpoint (e.g., a utility metering device or other networked device in the IoT) reports data to devices in upstream locations, such as a head office or data processing center. The transmission power level may be a level of power used in an RF signal in a cellular transmission, based on category M (NB1 in Europe) or other protocol.

At block 402, a first message may be transmitted (or received) over a cellular connection. The first message is sent according to reporting parameters, representative examples of which are seen at blocks 404 and 406. At block 404, one of the reporting parameters may include a reporting schedule indicating the time and date at which transmissions are to be made. At block 406, another of the reporting parameters may include a power level of the transmission and/or a number of allowable retries if the transmission fails.

At block 408, based at least in part on the reporting parameters, it may be determined that a predicted battery end-of-life date is before a prescribed date. The battery end-of-life date may be predicted a number of times during the life of the battery. During portions of the battery's life, it may use power to relay information for other endpoints. During other portions of the battery's life, other endpoints may relay information for the device it powers, thereby saving battery power. For at least these reasons, some changes to the battery end-of-life may be non-linear over the life of the battery.

At block 410, the reporting parameters may be adjusted to change the predicted battery end-of-life date. The calculations resulting in the adjustment may be performed in any desired location, such as on the battery-powered endpoint device or on a remote server. If the calculations are performed on a remote server, the adjusted reporting parameters may be sent to the endpoint. Future messages may be sent by an endpoint according to the example adjusted reporting parameters shown at blocks 412 and 414. In the example of block 412, a frequency of transmissions from the metering device may be reduced. This will result in a power savings, and may include a schedule that is configured to continue to provide adequate information-reporting. Alternatively, the frequency of reporting can be increased, if transmission of additional information is desired or of value. The increased reporting may result in battery failure after an acceptable lifespan, and/or may result in battery failure during a period wherein it would be convenient to replace the battery (e.g., a number of similarly located batteries may be replaced easily by workers). In the example of block 414, a power level used when transmitting the second message may be reduced. Reduction of the power level may be appropriate if the RSSI associated with reception of previous signals was strong enough to justify the reduction, and/or if a number of retries has been low. At block 416, a second message may be transmitted over the cellular connection according to the adjusted reporting parameters.

Figure 5:
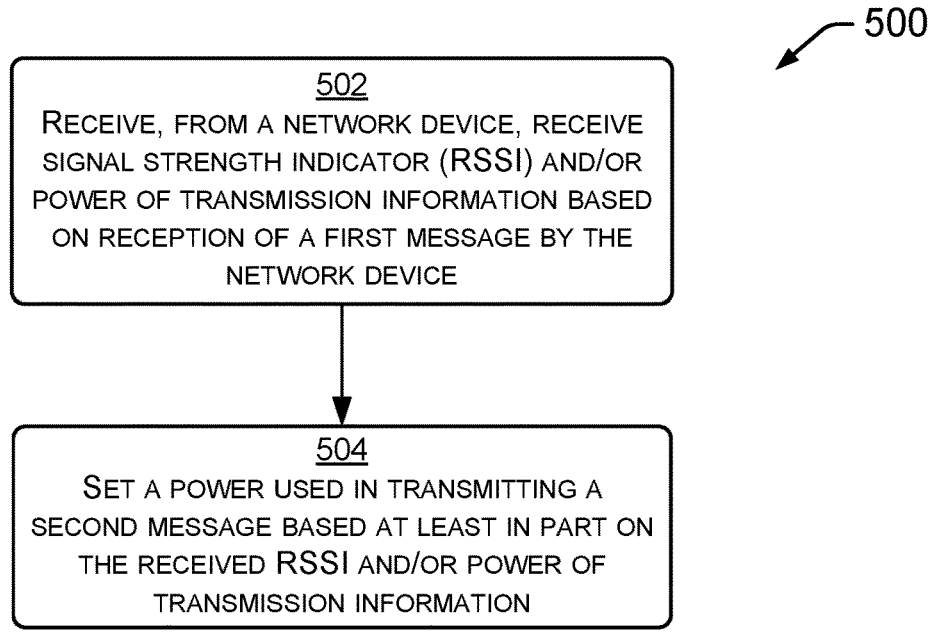
FIG. 5 is a block diagram showing an example of techniques by which a received signal strength indicator (RSSI) can be used to manage a power of transmission used by an endpoint.

FIG. 5 is a block diagram showing an example of techniques 500 by which a received signal strength indicator (RSSI) can be used to manage a power of transmission used by an endpoint. In a first example, the RSSI value associated with reception of a first signal may be used by a computing device managing the receiver (e.g., office 110) to adjust a transmission power level for subsequent transmissions by the network node. In a second example, if the RSSI value associated with reception of a first signal is transmitted from the receiver to the sender, the sender may adjust transmission power level for subsequent transmissions. Thus, with feedback from the receiver, the transmitter may repeatedly adjust transmission power level to result in adequate, but not excessive, RSSI at the receiving end. Since each endpoint may be a different distance (and in a different RF environment) each endpoint may transmit more efficiently than would be the case if a factory-preset transmission power was used. At block 502, a network device may send, and an endpoint may receive, RSSI information based on reception of a first message by the network device. Thus, the network device may provide the endpoint with feedback, e.g., RSSI values, on transmissions made by the endpoint. At block 504, an upstream device, or alternatively the endpoint, may set a power to be used in transmitting a second message to the network device. The power level set may be based at least in part on the received RSSI information.

Figure 6:
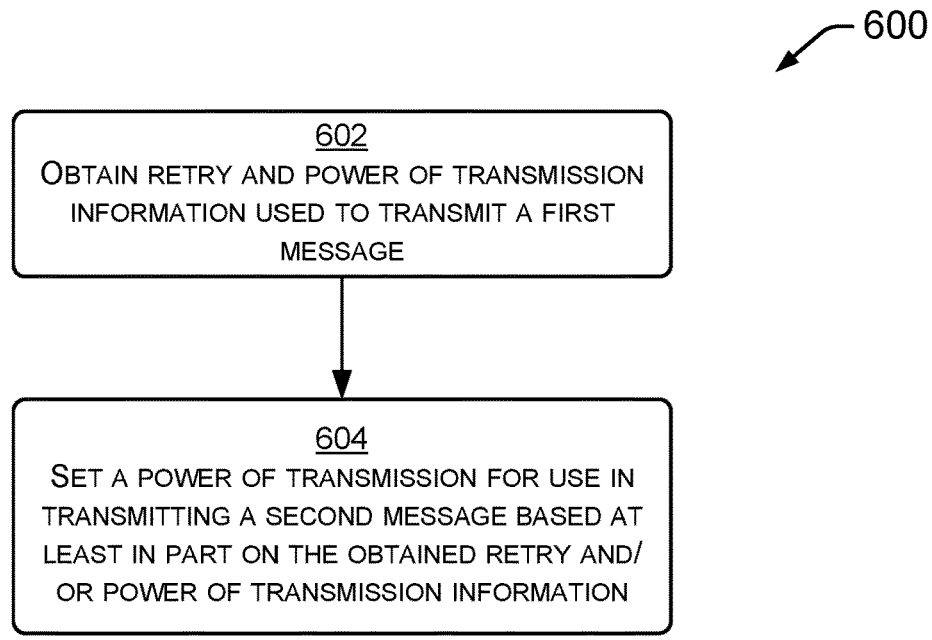
FIG. 6 is a block diagram showing an example of techniques by which transmission retry and power of transmission information may be used to manage a power of transmission used by an endpoint.

FIG. 6 is a block diagram showing an example of techniques 600 by which a number of transmission retries performed can be used to manage a power of transmission used by an endpoint. In an example, if the number of retries required to successfully transmit a first signal from sender to receiver is known, the sender may adjust transmission power level for subsequent transmissions. For example, over time, a relatively smaller number of retries may indicate that the power level of transmission is too high. Conversely, a relatively larger number of retries may indicate that the power level of transmission is too low. Thus, with feedback regarding a transmission retry count, the transmitter may adjust transmission power level one or more times to result in a reasonable and efficient number of retries. Since each endpoint may be a different distance from the data collector (and may be required to utilize a different power level), each endpoint may be more efficient when a customized number of retries are used and/or permitted. Referring to block 602, retry and power of transmission information used in transmitting a first message may be obtained by an endpoint. The information may be obtained by query to protocol stacks related to cellular transmissions or other sources. At block 604, a power level for use in transmission of a second message by the endpoint may be set by calculations performed on an upstream device, or by calculations performed on the endpoint. The power level may be based at least in part on one or more of the obtained number of transmission retries, the RSSI of messages sent by the endpoint, and/or previously used power-of-transmission information.

Figure 7:
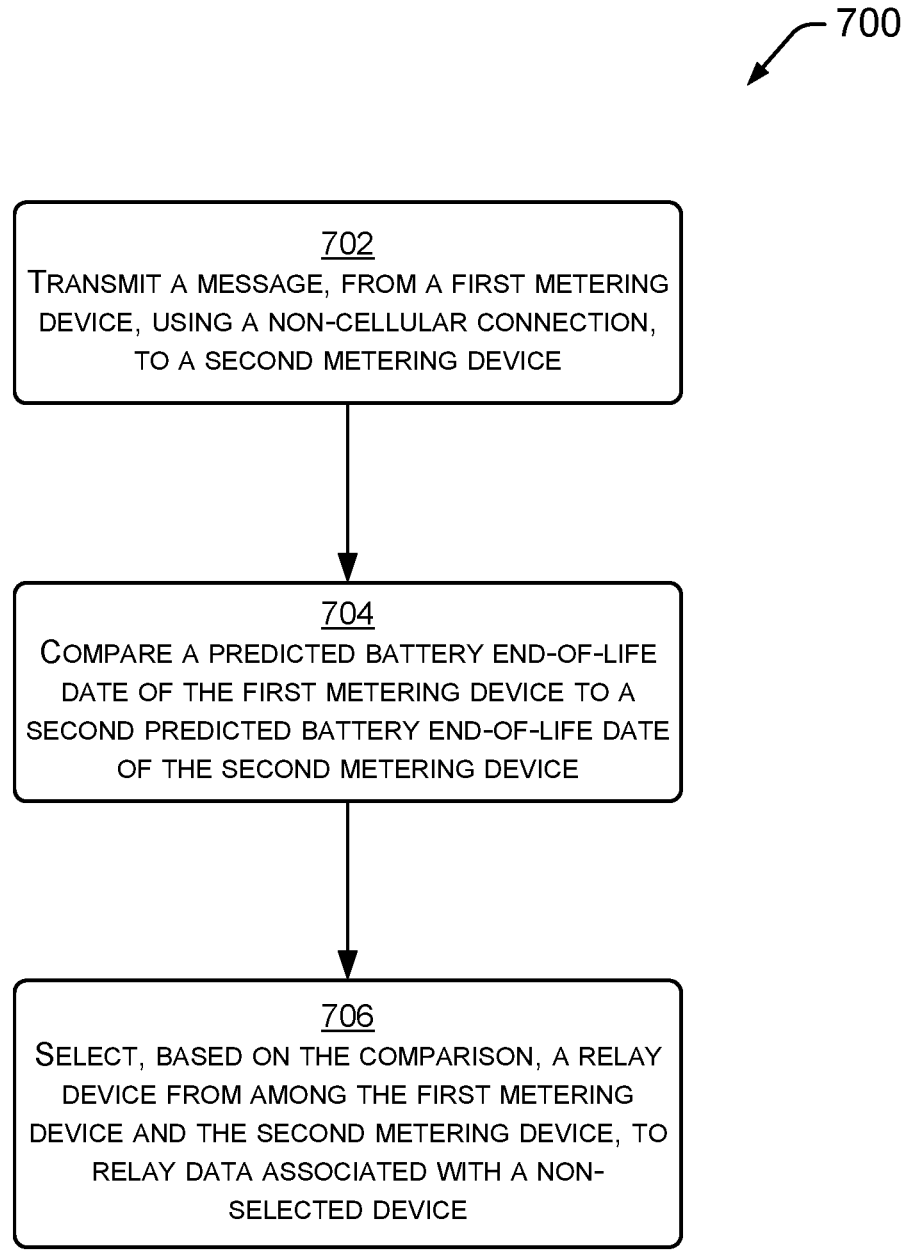
FIG. 7 is a block diagram showing an example of techniques by which a local mesh network may be formed to allow a single endpoint to relay information associated with other endpoints in the local mesh network.

FIG. 7 is a block diagram showing an example of techniques 700 by which local mesh network may be formed to allow a single endpoint to relay information associated with other endpoints in the local mesh network. By forming the local mesh, information from several endpoints may be aggregated at one endpoint, and only one cellular connection to a data collector is required to upload that information. The local mesh may be formed spontaneously by several geographically nearby endpoints, or may be formed at the direction of a data collector or main office server. At block 702, a metering device or other endpoint transmits a message, using a non-cellular connection, to a second metering device or other endpoint. The non-cellular connection may be RF or wired, and may have a power of transmission that is less than that which is required for a cellular transmission. At block 704, a predicted battery end-of-life date of the first metering device is compared to a second predicted battery end-of-life date of the second metering device. At block 706, based on the comparison, a relay device is selected from among the metering device and the second metering device, to relay data associated with the non-selected device to an upstream data collector. In an example, the endpoint with the strongest battery may be selected to relay the data of the other endpoint.

In an example of battery management of groups of endpoints, a group of endpoints may be determined. In the example, all of the endpoints within the group may be within a threshold distance of all others within the group. Alternatively, a localized group may be defined in any convenient manner. The reporting schedules of one or more endpoints in a first subgroup of endpoints in the group of endpoints may be adjusted to increase a frequency of reporting transmissions. Conversely, reporting schedules of one or more endpoints in a second subgroup of endpoints in the group of endpoints may be adjusted to decrease a frequency of reporting transmissions. Thus, some of the endpoints in the group increase, and some decrease, their reporting schedules. The adjustments to the reporting schedules of the subgroups may be made so that a reduction in the variance of estimated battery time-of-failure of endpoints in the group of endpoints results. In the example, endpoints with stronger batteries may transmit (over a cellular connection) more information and/or more frequently. Endpoints with weaker batteries may transmit (over a cellular connection) less information and/or less frequently. Conveniently, the batteries in both groups may be replaced at the same time.

In a further example of battery management of groups of endpoints, a group of endpoints may be determined, such as a group formed by endpoints that are within a threshold distance of all others within the group of endpoints. A battery power manager may determine times (e.g., times of day) wherein endpoints within the group have fewer retry transmissions. The battery power manager may base a revised and/or second reporting schedule in part on the determined times of day.

In a further example of battery management of groups of endpoints, a group of endpoints may be determined, such as a group formed by endpoints that are within a threshold distance of all others within the group of endpoints. Times may be determined wherein transmissions made by endpoints within the group are associated with higher receive signal strength indicators (RSSI) by receivers of the transmissions. Accordingly, revised reporting schedules may direct at least some of the transmissions to be made during the times of day associated with higher RSSI values.

Figure 8:
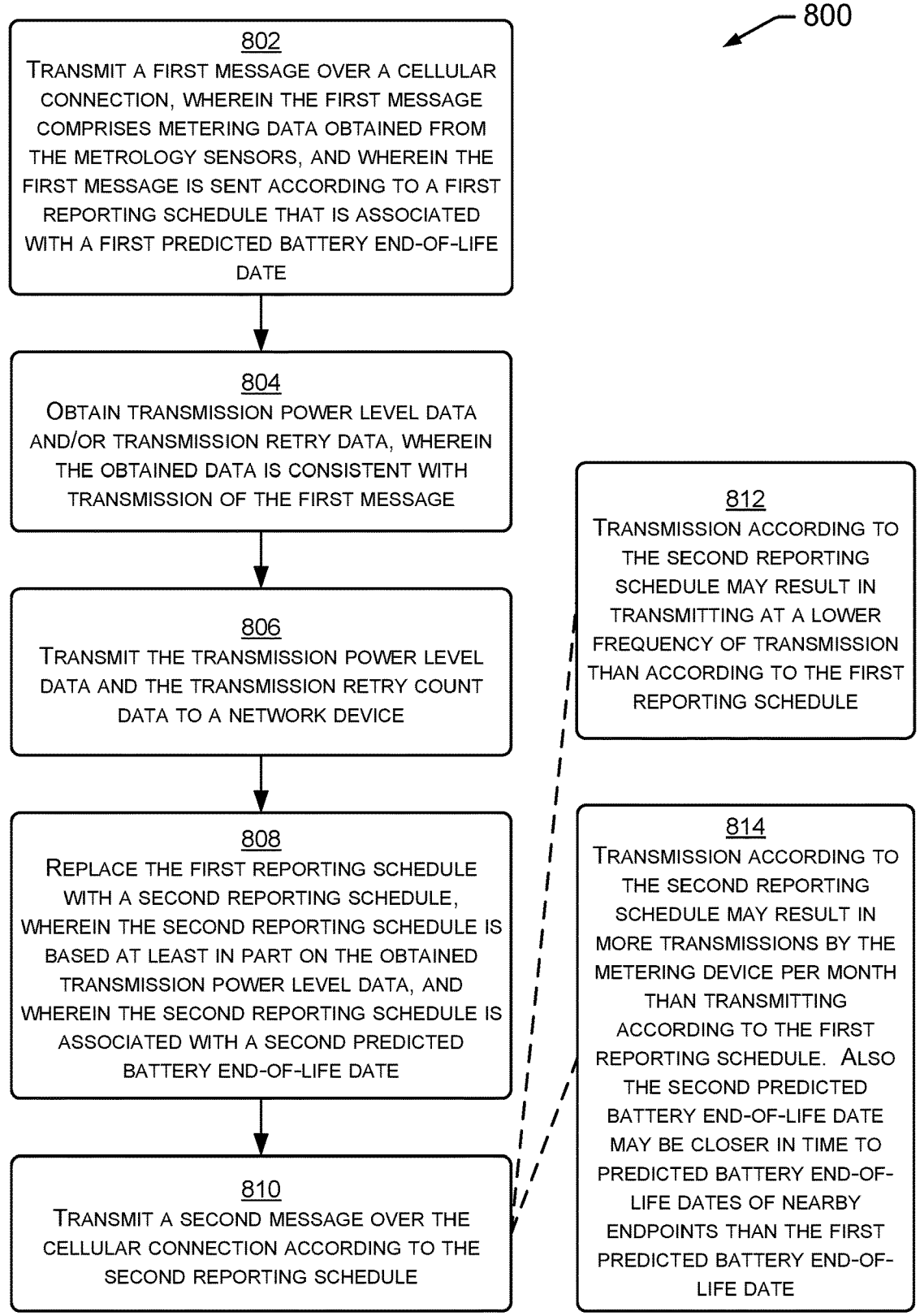
FIG. 8 is a block diagram showing example techniques by which a network endpoint can alter reporting parameters to save battery power.

FIG. 8 is a block diagram showing a second example techniques 800 by which a network endpoint can alter reporting parameters to thereby manage battery power. At block 802, a first message may be transmitted over a cellular connection. The first message may include metering data obtained from metrology sensors. Additionally, the first message may be sent according to a first reporting schedule that is associated with a first predicted battery end-of-life date.

At block 804, transmission power level data is obtained. The obtained transmission power level data is consistent with transmission of the first message. At block 806, the transmission power level data and the transmission retry count data may be transmitted in messages to a network device, such as the data collector or a central data processing server. At block 808, the first reporting schedule is replaced with a second reporting schedule. The second reporting schedule may be based at least in part on the obtained transmission power level data and the resultant power consumption in view of the first reporting schedule. Additionally, the second reporting schedule may be associated with a second predicted battery end-of-life date.

At block 810, a second message may be transmitted over the cellular connection according to the second reporting schedule. Two alternative examples of the transmission are shown in blocks 812 and 814. In the example of block 812, transmissions, made according to the second reporting schedule, may result in fewer transmissions by the metering device per month than transmitting according to the first reporting schedule. In the alternative example shown at block 814, transmissions of messages, when performed according to the second reporting schedule, may result in more transmissions by the metering device per month than transmitting according to the first reporting schedule. This may be advantageous if the additional transmissions have value and the second predicted battery end-of-life date is closer to a predicted battery end-of-life dates of a nearby endpoint than the first predicted battery end-of-life date. This allows more efficient battery replacement of several nearby endpoints at once.

Figure 9:
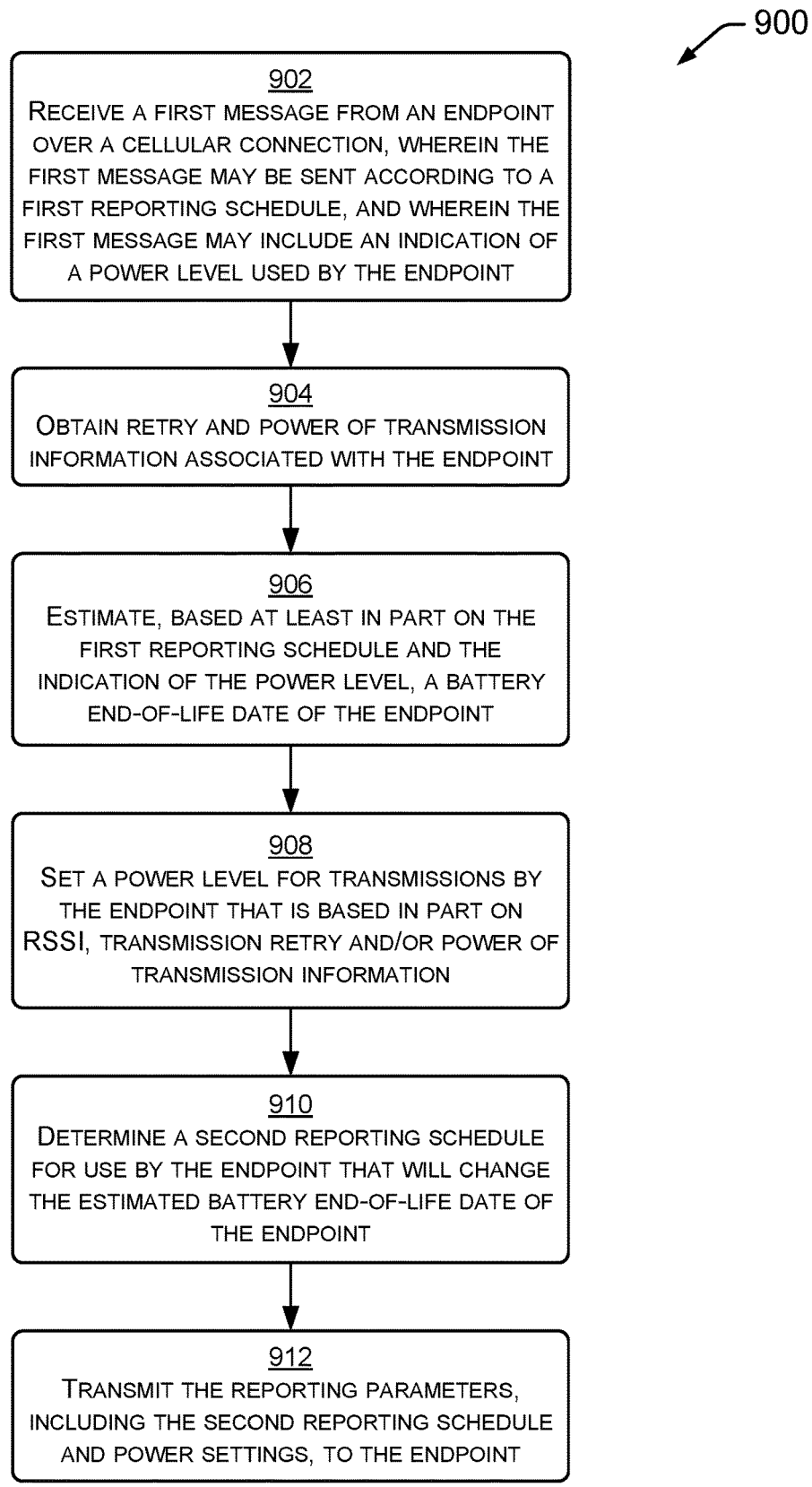
FIG. 9 is a block diagram showing example techniques by which a network server can provide reporting parameters to network endpoints, including a reporting schedule, transmit power levels and/or allowable numbers of transmission retries.

FIG. 9 is a block diagram showing example techniques 900 by which a network server can provide reporting parameters to network endpoints, including a reporting schedule, transmit power levels and/or allowable numbers of transmission retries.

At block 902, a first message may be received from an endpoint over a cellular connection. In an example, the first message may be sent according to a first reporting schedule, and may include an indication of a power level used by the endpoint in making the transmission. At block 904 power of transmission, RSSI, and numbers of transmission retry information associated with the endpoint may be obtained. The power of transmission of messages sent by the endpoint may be included in those messages. RSSI values may be obtained when the messages are received. Transmission retry information may also be included in the messages. The endpoints may count retries and/or obtain retry information from software layers associated with the cellular transmitter of the endpoint.

At block 906, based at least in part on the first reporting schedule, the retry information and the indication of the power level, an estimate of battery end-of-life date of the endpoint may be made. The estimate may be based at least in part on the expected number of transmissions indicated by the reporting schedule, estimated retries and the power level used in the transmissions.

At block 908, a power level for transmissions by the endpoint may be set. The power level may be based at least in part on historical power of transmission information and/or the RSSI of previous messages sent by the endpoint. The reporting schedule and/or previous numbers of transmission retries may also be considered. In an example, previously used transmission power level, the RSSI values, and the number of retries can be used to estimate a power level that will result in acceptable RSSI values and acceptable numbers of transmission retries. At block 910, a second reporting schedule for use by the endpoint may be determined. The second reporting schedule is configured to change the estimated battery end-of-life date of the endpoint as desired. At block 912, the reporting parameters, including the second reporting schedule and power settings, may be transmitted to the endpoint.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method, performed at least in part by a computing device, comprising:
    under control of one or more processors of the computing device configured with executable instructions:
    receiving a message from an endpoint over a cellular connection, wherein the message is sent according to a first reporting schedule, and wherein the message includes an indication of a transmission power-level used by the endpoint;
    obtaining received signal strength indicator (RSSI) information associated with a signal sent by the endpoint at the transmission power-level;
    estimating, based at least in part on the first reporting schedule, the indication of the transmission power-level, and the RSSI information, an estimated battery end-of-life date of the endpoint;
    determining a second reporting schedule for use by the endpoint that changes the estimated battery end-of-life date of the endpoint and that reduces a variance of the estimated battery end-of-life date of the endpoint relative to estimated battery end-of-life dates of one or more other endpoints; and
    transmitting the second reporting schedule to the endpoint.

2. The method of claim 1, additionally comprising:
    adjusting the transmission power-level used by the endpoint to report according to the second reporting schedule, wherein the adjusting is based at least in part on the indication of the transmission power-level and the RSSI information.

3. The method of claim 1, additionally comprising:
    adjusting a transmission frequency used by the endpoint to report according to the second reporting schedule.

4. The method of claim 1, additionally comprising:
    estimating an end-of-life date of a battery of a second endpoint that is within a threshold distance of the endpoint;
    wherein determining the second reporting schedule for the endpoint is based at least in part on the estimated end-of-life date of the battery of the second endpoint.

5. The method of claim 1, additionally comprising:
obtaining power of transmission information associated with the endpoint; and
setting a power-level for transmissions by the endpoint that is based at least in part on the power of transmission information.

6. The method of claim 1, additionally comprising:
directing a plurality of endpoints to form a local mesh network; and
receiving data over the cellular connection regarding at least some of the plurality of endpoints through a single endpoint from among the plurality of endpoints.

7. A method, performed at least in part by a computing device, comprising:
under control of one or more processors of the computing device configured with executable instructions:
receiving a message from an endpoint over a cellular connection, wherein the endpoint comprises a utility meter and the message is sent according to a first reporting schedule according to which the endpoint is to report meter data, and wherein the message includes an indication of a transmission power-level used by the endpoint;
obtaining received signal strength indicator (RSSI) information associated with a signal sent by the endpoint at the transmission power-level;
estimating, based at least in part on the first reporting schedule, the indication of the transmission power-level, and the RSSI information, an estimated battery end-of-life date of the endpoint;
determining a second reporting schedule for use by the endpoint that changes the estimated battery end-of-life date of the endpoint;
transmitting the second reporting schedule to the endpoint;
receiving metering data from the endpoint over the cellular connection according to the second reporting schedule;
determining a group of endpoints, wherein all endpoints within the group of endpoints are within a threshold distance of all other endpoints within the group of endpoints;
adjusting a reporting schedule of one or more first endpoints in a first subgroup of endpoints in the group of endpoints to increase a first frequency of reporting transmissions; and
adjusting a reporting schedule of one or more second endpoints in a second subgroup of endpoints in the group of endpoints to decrease a second frequency of reporting transmissions;
wherein the adjusting of the reporting schedules of the first subgroup of endpoints and the second subgroup of endpoints reduces variance of estimated battery time-of-failure of endpoints in the group of endpoints.

8. The method of claim 1, wherein determining the second reporting schedule comprises:
determining a group of endpoints, including the endpoint, wherein all endpoints within the group of endpoints are within a threshold distance of all other endpoints within the group of endpoints;
determining a first time-period during which endpoints within the group of endpoints have fewer retry transmissions than during at least a second time-period; and
basing the second reporting schedule at least in part on the first time-period.

9. The method of claim 1, wherein determining the second reporting schedule comprises:
determining a group of endpoints, including the endpoint, wherein all endpoints within the group of endpoints are within a threshold distance of all other endpoints within the group of endpoints;
determining a first time-period during which endpoints within the group of endpoints have a higher RSSI than during a second time-period; and
basing the second reporting schedule at least in part on the first time-period.

10. A method, performed by a first metering device, comprising:
under control of one or more processors configured with executable instructions:
transmitting or receiving a first message over a cellular connection, wherein the first message comprises metering data and is sent according to reporting parameters;
obtaining retry information and received signal strength indicator (RSSI) information associated with the first message;
receiving adjusted reporting parameters to:
change an estimated battery end-of-life date, wherein the adjusted reporting parameters are based at least in part on the retry information and RSSI information; and
reduce a variance of the estimated battery end-of-life date of the first metering device relative to estimated battery end-of-life dates of one or more other metering devices;
transmitting or receiving a second message over the cellular connection according to the adjusted reporting parameters; and
transmitting or receiving metering data over the cellular connection according to the adjusted reporting parameters.

11. The method of claim 10, additionally comprising:
transmitting a message, from the first metering device to a second metering device on a non-cellular mesh network;
comparing a first predicted battery end-of-life date of the first metering device to a second predicted battery end-of-life date of the second metering device; and
selecting the first metering device to relay data associated with the second metering device over the cellular connection, wherein the selecting is based on the comparing, and wherein the reporting parameters comprise:
a schedule for reporting consumption data obtained by a metering device; and
a power-level to be used for transmission over the cellular connection.

12. The method of claim 10, wherein adjusting the reporting parameters comprises at least one of:
reducing a frequency of transmissions from the first metering device or a second metering device; or
reducing a power-level used when transmitting the second message.

13. The method of claim 10, additionally comprising:
receiving, from a network device, the RSSI information based on reception of the first message by the network device; and
setting a power of transmission for use in transmitting the second message based at least in part on the RSSI information.

14. The method of claim 10, wherein the method additionally comprises:
setting a power of transmission for use in transmitting the second message based at least in part on the retry information and the RSSI information.

15. The method of claim 10, additionally comprising:
setting a power-level for transmissions by the first metering device that is based at least in part on at least one of the retry information or the RSSI information.

16. A device, comprising:
a processor;
a sensor in communication with the processor;
memory in communication with the processor;
instructions, stored in the memory, which when executed by the processor configure the device to perform actions comprising:
transmitting a first message over a cellular connection, wherein the first message is sent according to a first reporting schedule that is associated with a first estimated battery end-of-life date;
obtaining received signal strength indicator (RSSI) information associated with the first message transmitted over the cellular connection; and
transmitting a second message over the cellular connection according to a second reporting schedule, wherein the second reporting schedule is based at least in part on the RSSI information, wherein the second reporting schedule is associated with a second estimated battery end-of-life date, and wherein the second reporting schedule is configured so that a second variance, between the second estimated battery end-of-life date and estimated battery end-of-life dates of other devices, is less than a first variance, between the first estimated battery end-of-life date and estimated battery end-of-life dates of one or more other devices.

17. The device of claim 16, wherein:
transmitting according to the second reporting schedule comprises transmitting at a lower frequency of transmission than according to the first reporting schedule.

18. The device of claim 16, wherein:
transmitting according to the second reporting schedule comprises transmitting at a higher frequency of transmission than according to the first reporting schedule; and
the second estimated battery end-of-life date is closer in time to a third estimated battery end-of-life date of a nearby endpoint than the first estimated battery end-of-life date.

19. The device of claim 16, additionally comprising:
transmitting transmission power-level data and the RSSI information in one or more messages to a network device.

20. The device of claim 16, additionally comprising:
selecting, based at least in part on the RSSI information, a new power-level for use in sending messages according to the second reporting schedule.

* * * * *